United States Patent [19]

Meyer et al.

[11] Patent Number: 4,721,829

[45] Date of Patent: Jan. 26, 1988

[54] GAS INSULATED TRANSMISSION LINE WITH SHIELDED ELECTRICAL JOINT ASSEMBLY

[75] Inventors: Jeffry R. Meyer, Penn Hill Township, Allegheny County, Pa.; Melvyn D. Hopkins, N. Grafton; Gary K. Bowman, Westboro, both of Mass.

[73] Assignee: Westinghouse Electric Corp., Pittsburgh, Pa.

[21] Appl. No.: 938,910

[22] Filed: Dec. 8, 1986

[51] Int. Cl.$^4$ ............................................. H02G 5/06
[52] U.S. Cl. ............................... 174/21 JS; 174/14 R; 174/73 R; 439/252
[58] Field of Search ................ 174/14 R, 16 B, 21 R, 174/21 JS, 21 JC, 21 C, 21 CA, 73 R, 99 E; 339/64 R, 255 R, 255 P, 262 R; 439/246, 252

[56] References Cited

U.S. PATENT DOCUMENTS

| | | | |
|---|---|---|---|
| 2,615,949 | 10/1952 | Hecking | 339/64 R |
| 3,982,806 | 9/1976 | Wilson et al. | 339/64 R |
| 4,038,486 | 7/1977 | Meyer et al. | 174/16 B X |
| 4,111,511 | 9/1978 | Bolin | 339/64 R |

OTHER PUBLICATIONS

Westinghouse Descriptive Bulletin 33-650, "Type CGI Compressed Gas Insulated Bus", Jun. 1982, pp. 1-8.

Primary Examiner—Laramie E. Askin
Attorney, Agent, or Firm—G. H. Telfer

[57] ABSTRACT

A segmented inner conductor of a transmission line has joints between the segments with a plug on one segment fitting into a socket on an adjacent segment. An electrostatic shield covers the joint and confines particles. Particular features have to do with simplifying the parts and their means of assembly for speed and economy including a plug end having a stop configured for easy assembly with the main portion of an inner conductor segment, a shield with a folded under portion over a bond joining the plug end to the inner segment main portion, spring loaded contacts holding the shield to the plug end, and use of a retaining ring, without bonding, to secure a ring of contact fingers to a socket end.

5 Claims, 4 Drawing Figures

GAS INSULATED TRANSMISSION LINE WITH SHIELDED ELECTRICAL JOINT ASSEMBLY

BACKGROUND AND SUMMARY OF THE INVENTION

This invention relates to gas insulated transmission lines in which an inner conductor is provided in segments with a joint assembly permitting relative movement of the segments.

Reference is made to Bolin U.S. Pat. No. 4,111,511, Sept. 5, 1978 on a high current contact assembly for gas insulated transmission lines. The Bolin patent discloses a contact assembly for electrically connecting two conductors wherein a plug member is secured to one conductor segment and a socket member is secured to another conductor segment with the plug being received by the socket member. Within an annular recess of the socket member a plurality of contact fingers are disposed in a holder that has an axial projection extending therefrom adjacent the contact fingers and radially outward therefrom. Resilient biasing means are disposed between the contact fingers and the holder and act upon the contact fingers and loading means are utilized to produce a force upon the contact fingers. The contact fingers thus provide good electrical contact between the plug and socket while allowing relative movement of those members. The description of the Bolin patent is herein incorporated by reference.

In accordance with the preferred embodiment of the above-mentioned patent the plug member fits inside the end of the conductor segment to which it is welded by a filet weld. Also, the socket member is welded to the extremity of the conductor segment to which it is bonded. In that embodiment, an electrical shield extends over the parts of the joint assembly including the contact fingers and the joint between the plug member and its conductor segment although not the weld between the socket member and its conductor segment. The shield is a metal element that is provided in electrical contact with the plug by a spring bias contact through one or more apertures within the conductor segment to which the plug is joined.

Additionally, the preferred embodiment of the above-mentioned patent provides for mounting the contact fingers by an annular retainer, a holding ring and bearing members which entail a weld between the retaining member and the socket member.

Assemblies as taught by the above-mentioned patent have been made and used successfully. However, the thrust of development at the present time is to provide gas insulated transmission lines of greater simplicity in terms of numbers of parts, less expensive parts, and easier fabrication and assembly without giving up anything in terms of performance capability. It is primarily to achieve such qualities in a shielded joint assembly that the present invention is directed.

Reference is also made to Meyer et al. U.S. Pat. No. 4,038,486, July 26, 1977, which is directed to a joint assembly used in conjunction with a nearby supporting insulator assembly.

Electrical joints in gas-insulated transmission lines must be of a smooth electrical shape to prevent dielectric breakdown from the joint, at the high voltage of the central conductor, to the outer conductor which is at ground potential. They must also carry high currents without generating so much heat that there is impaired operation and must allow for axial relative motion in a sliding contact arrangement because of thermal differences from one end of the transmission line to the other. In addition, the joint must allow for some degree of bending at the joint, provide mechanical support radially and control the movement of conductive particles that may be generated during joint operation as a result of the sliding and bending movements. A joint assembly in accordance with the present invention achieves these requirements with relatively few, simple parts and allows for rapid assembly during manufacture or under field conditions.

In accordance with the invention, briefly, plug and socket ends are respectively welded to the major portions of two inner conductor segments with the plug shaped at the weld end to allow minimal weld fixturing and so that it can easily be sized for any particular conductor inner diameter. In particular, the plug end has an inner portion that fits within the adjacent major portion of the inner conductor segment, and an intermediate portion having an outer diameter substantially equal to that of the conductor segment major portion with the plug inner and intermediate portions forming a shoulder or stop against which the major portion of the inner conductor segment abuts to fix the location of the parts during welding. The outer portion of the plug end is configured with an outer diameter less than the inner diameter of the socket end within which it fits.

A contact means similar to that of the above-referred to Bolin patent is utilized except that the contact means is assembled to the socket member simply by having an end load design and the retaining is accomplished using a retaining ring to allow rapid assembly and/or replacement. The ring is simply a split ring of metal fitting within a slot in the surface of the socket. Its use is effective to hold the contacts and is beneficial in avoiding the need for any weld.

The shield is a machined or spun metal member that has spring loaded contacts (one or more), to retain the shield to the plug and to electrically connect them together. The shield covers the welds for both the plug and socket ends and the contact area. This allows both the welds to be merely rough-finished. Alternatively, where the shield is desired to be made shorter, the weld for the socket end need not be covered by the shield but it is then smooth finished.

Additional features include the provision of the permanently tacky material coated on the mid inside diameter region of the shield in order to trap any particles generated by contact wear or not removed in the manufacturing process. Furthermore, a plastic guide ring is installed inside one end to prevent particle generation and to act as a secondary particle barrier.

The various features of the invention, preferably used in combination, provide the needed functions of voltage shielding, current transfer, flexibility, axial motion and particle control in a compact and economical design.

DESCRIPTION OF THE PREFERRED EMBODIMENTS

Figure 1:
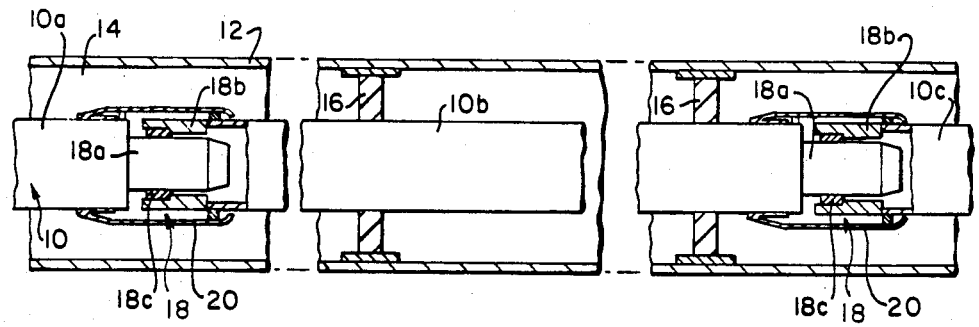
FIG. 1 is a longitudinal cross sectional view, very generalized, of a gas insulated transmission line in which the present invention may be advantageously utilized.

Reference is made to FIG. 1 for general orientation. A gas insulated transmission line generally comprises an inner or central conductor 10, normally of hollow aluminum, located within an outer metallic sheath 12 with a gas insulation medium 14 such as sulfur hexafluoride filling the otherwise unoccupied space within the sheath 12. The central conductor 10 is supported by insulators 16 in relation to the outer sheath 12. For most applications the required length of conductor 10 is so great that it is provided in a number of segments such as 10a, 10b, and 10c for ease in manufacture, handling, and use. Segments typically extend up to about 60 feet. Electrical joints 18 between adjacent segments of conductor 10 allow for relative movement.

The electrical joints 18 generally comprise a plug member 18a on one conductor segment (shown on the right end of segments 10a and 10b) and a socket member 18b on a second conductor segment (shown on the left end of segments 10b and 10c) with a mating fit therebetween. Contact elements 18c secured to the socket 18b ensure good electrical conductivity between the segments while permitting motion. A shield 20 is also provided over each joint 18. Reference is again made to Bolin U.S. Pat. No. 4,111,511, Sept. 5, 1978 for further information with respect to electrical joints as have been previously used.

The desirable qualities of the electrical joints 18 in the apparatus are:

(1) The shaping of the elements should be such as to minimize risk of electrical breakdown through the dielectric medium 14 from a joint 18, which carries a high voltage such as up to about 1200 kV, to the outer conductor 12, which is at ground potential.

(2) The joint must carry high currents such as up to about 4000 A on a continuous basis with transients up to about 100 kA without heating to an extent that causes damage to the parts.

(3) The joint must allow for relative axial motion by a sliding contact arrangement.

(4) The joint must allow bending (or tilting) at the joint. That is, consideration must be given to the possibility for adjacent conductor segments to be out of alignment by, for example, about 3 degrees;

(5) The joint must provide adequate mechanical support radially. That is, the joint assembly should permit one side of the joint, such as plug, to be a considerable distance, such as up to about 20 feet, from an insulator support, if the other side, the socket, is within a few feet of a fixed insulator support without appreciable drooping from the conductor center line.

(6) The joint assembly must control the movement of conductive particles that may be generated during joint operation. That is, because the sliding and bending motions occurring at the joint may produce conductor particles that could lead to an electrical breakdown of the dielectric medium, it is necessary to trap or control the movement of those particles with an effective shield 20.

Figure 2:
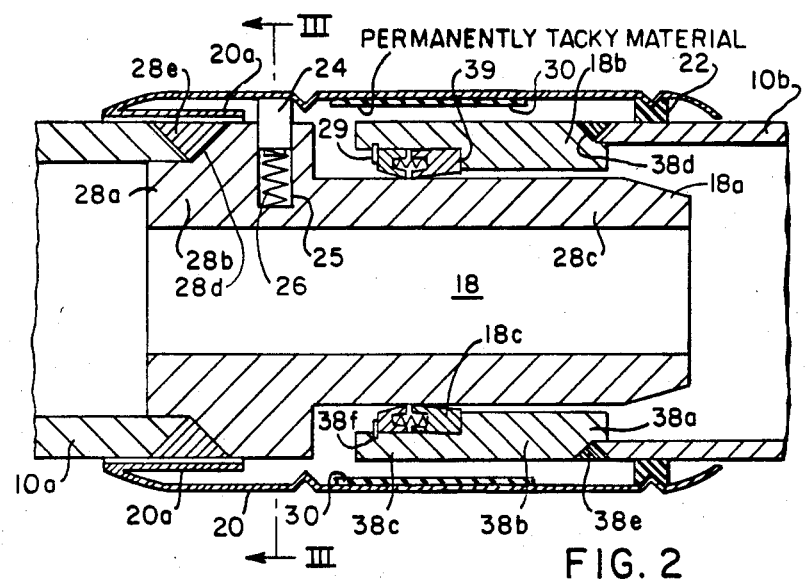
FIG. 2 is a partial longitudinal cross sectional view of an embodiment of a shielded electrical joint assembly for use in the present invention.

Referring now to FIG. 2 for an embodiment of the present invention which achieves those purposes, two inner conductor segments 10a and 10b are seen of which a first segment 10a has a plug end 18a bonded to it such as by welding and the second segment 10b has a socket end 18b bonded to it such as by welding with the plug end of the first segment fitting into the socket end of the second segment.

The plug end 18a has an inner portion 28a fitting within the inner part of a major portion of the first segment 10a, an intermediate portion 28b having an outer diameter substantially equal to that of the major portion of segment 10a and an outer portion 28c that fits within socket 18b. Reference to the major portion of a segment means the length between a plug on one end and a socket on the other. The inner and intermediate portions 28a and 28b form a shoulder at stop 28d against which the major portion abuts and at which a weld or other bond 28e is located. This minimizes fixturing requirements during the welding operation.

On the socket end 18b of segment 10b is attached a contact means 18c, such as like that of the above-mentioned Bolin patent. The contact means 18c is attached to the inside extremity of the socket end for making a sliding electrical joint between the socket 18b and the plug 18a. The socket 18b has an inner portion 38a within segment 10b, and an intermediate portion 38b that extends up to the contacts 18c and an outer portion 38c directly around the contacts. Socket portions 38a and 38b form a shoulder or stop 38d for the major portion of segment 10b to facilitate forming a weld 38e.

A shield 20 is provided for covering and electrostatically shielding the electrical joint 18. The shield 20 comprises a metal member, encircling the joint and secured in place on the plug end 18a of the first segment 10a.

The shield has a folded under portion 20a over the weld 28e between the plug end 18a and the major portion of the first segment 10a. The shield also is formed to fit intimately in relation with a seal ring 22 located around the socket end 18b.

Figure 3:
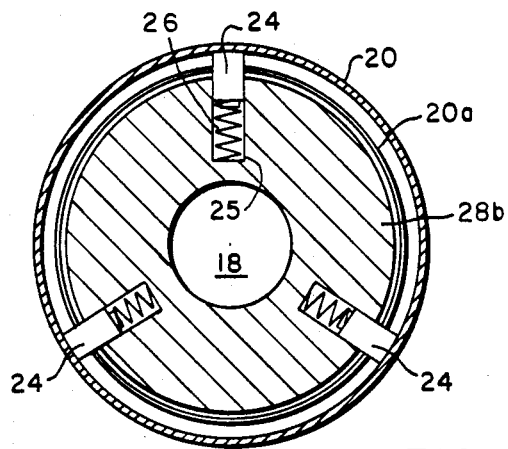
FIG. 3 is a sectional view taken along the line III—III of FIG. 2.

One or more spring loaded contacts 24, such as three as illustrated in FIG. 3, are used for securing the shield 20 on the plug end 18a and electrically connecting the shield and the plug end. The contacts 24 are cylindrical elements that fit in apertures 25 with a spring 26 for biasing the contact against the shield.

Figure 4:
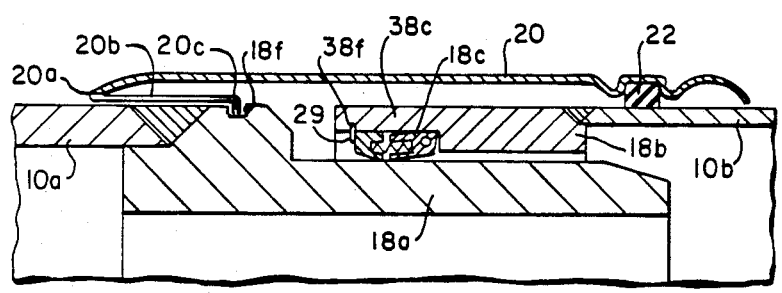
FIG. 4 is a partial longitudinal view of an alternative embodiment of a shielded joint assembly in accordance with the present invention.

In an alternative arrangement as illustrated in FIG. 4 the shield 20 is slit in the folded-over portion 20a so as to provide spring fingers 20b that have a radially inturned end 20c fitting within a groove 18f of the plug end and are retained there. The arrangement of FIG. 4 also holds the shield 20 in place and provides electrical contact between the shield and plug.

The contact means 18c employed on the socket 18b in either FIGS. 2 or 4 comprises a spring biased ring of contact fingers enclosed within the socket outer portion 38c. The contacts are generally in accordance with the above-referred to Bolin patent but with a difference in how the ring is secured. The ring of contact fingers in accordance with the invention is held in place between a shoulder 39 on the socket end and a retaining ring 29 located in a groove 38f of the socket end. The holding of the contact fingers 18c in this manner thus requires no weld or other band. This end load design with the retaining ring 29 allows rapid initial assembly as well as rapid replacement in the field.

The shield may be a machined or spun metal element that encloses and electrically hides the joint 18. A mid-inside diameter region, at least, is preferably coated with a permanently tacky material 30 such as Pliobond cementing material of Goodyear Rubber Co. that will trap any particles generated by contact wear or remaining following the manufacturing process. The plastic guide or seal ring 22 is installed inside one end of the shield to reduce particle generation and act as a secondary particle barrier.

The metal contact plug 18a may be wrought, forged or cast. It is preferably welded onto an inner conductor major segment 10a, the weld requiring little smoothing for electrical shape because the shield 20 covers the weld area. The plug is shaped at the weld end to allow minimal weld fixturing and can easily be sized for any conductor inner diameter. The contact area of plug portion 28c is coated with a conductive metal, such as silver, by plating or plasma deposition means. A lead-in cone shape on the end of inner plug portion 28c is provided to aid assembly of the joint.

On the spring-loaded contacts 24 of FIGS. 2 and 3 a suitable contact material, such as copper-graphite, is used to prevent particle generation where they touch the shield 20 and also to provide a low resistance contact interface. The contacts 24 are disposed in holes 25 provided in the plug body, the hole diameter and shield contact annular cavity being larger than the contact to allow free but limited pivoting of the shield during joint bending.

A contact material such as copper-graphite may also be used on the ends 20c of the spring fingers in FIG. 4 for a good low resistance contact.

We claim:

1. A gas insulated transmission line comprising:
   first and second inner conductor segments supported within an outer sheath, each having a major portion of a hollow cylindrical configuration with substantially uniform inner and outer dimensions, said first segment having a plug end bonded to said major portion thereof and said second segment having a socket end bonded to said major portion thereof within which said plug end of said first segment fits;
   contact means attached to an inside extremity of said socket end for making a sliding electrical joint between said socket end and said plug end; and,
   a shield for covering and electrostatically shielding said electrical joint, said shield comprising a metal member encircling said joint and held in place on said plug end of said first segment, said shield having a folded under portion over said bond between said plug end and said major portion of said first segment, said shield also being formed to fit on a seal ring located in close relation to said socket end.

2. A gas insulated transmission line in accordance with claim 1 wherein: a spring loaded contact holds said shield on said plug end and electrically connects said shield and said plug end.

3. A gas insulated transmission line in accordance with claim 1 wherein: said folded under portion of said shield has longitudinally running slots providing spring action for holding said shield on said plug end by an edge of said shield extending radially within a groove in said plug end.

4. A gas insulated transmission line in accordance with claim 1 wherein:
   said contact means comprises a spring biased ring of contact fingers encircling the inside of said socket end and said ring of contact fingers is held in place between a shoulder on said socket end and a retaining ring located in a groove of said socket end.

5. A gas insulated transmission line in accordance with claim 1 wherein:
   said plug end has an inner portion fitting within said major portion of said first segment, an intermediate portion having an outer diameter substantially equal to that of said major portion, said inner portion and said intermediate portion forming a shoulder against which said major portion abuts and at which a bond is located, and an outer portion having an outer diameter less than the inner diameter of said socket end.

* * * * *